United States Patent [19]
Toyosawa et al.

[11] Patent Number: 5,066,556
[45] Date of Patent: Nov. 19, 1991

[54] NON-AQUEOUS ELECTROLYTE SECONDARY CELL

[75] Inventors: Shinichi Toyosawa, Tokorozawa; Masao Ogawa, Kawagoe; Yoshitomo Masuda, Tachikawa; Hideharu Daifuku, Akishima; Takahiro Kawagoe, Tokorozawa, all of Japan

[73] Assignees: Bridgestone Corporation, Tokyo; Seiko Electric Components Ltd., Sendai, both of Japan

[21] Appl. No.: 497,883

[22] Filed: Mar. 23, 1990

[30] Foreign Application Priority Data

Mar. 31, 1989 [JP] Japan ................................ 1-78071

[51] Int. Cl.$^5$ ...................... H01M 4/60; H01M 10/40
[52] U.S. Cl. ...................... 429/194; 429/213
[58] Field of Search ...................... 429/213, 194

[56] References Cited

U.S. PATENT DOCUMENTS

| 4,717,634 | 1/1988 | Daifuku et al. | 429/213 |
| 4,731,311 | 3/1988 | Suzuki et al. | 429/213 |
| 4,772,517 | 9/1988 | Muenstedt et al. | 429/213 |

Primary Examiner—Donald L. Walton
Attorney, Agent, or Firm—Oblon, Spivak, McClelland, Maier & Neustadt

[57] ABSTRACT

A new approach for efficient current collection is provided for a nonaqueous electrolyte secondary cell comprising a positive electrode having a polyaniline or conductive organic polymer as an active material, a negative electrode, a nonaqueous electrolyte, and an outer casing having these components received therein. The positive electrode is affixed to the inner surface of an outer casing segment associated with the positive electrode through a conductive adhesive layer having carbon powder dispersed in a base polymer. The cell can recover from an over-discharged state.

6 Claims, 1 Drawing Sheet

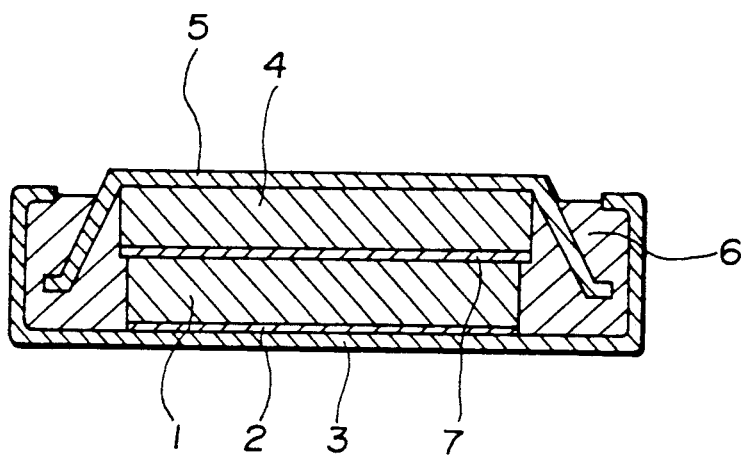

NON-AQUEOUS ELECTROLYTE SECONDARY CELL

This invention relates to a non-aqueous electrolyte secondary cell using an organic electroconductive polymer, typically polyaniline as the positive electrode active material and more particularly, to such a secondary cell having improved over-discharge recovery.

BACKGROUND OF THE INVENTION

Active efforts have been made in these years for the development of so-called polymer batteries which use electroconductive organic polymers such as polyaniline, polypyrrole, and polyacetylene as the electrode material. Among others, nonaqueous electrolyte secondary cells using polyaniline in the positive electrode have advantages of a high voltage and improved shelf storage. They are expected to find commercial applications as a memory backup power supply for computers and as a power supply for portable equipment. In fact, some polyaniline batteries are on the verge of entering commercial manufacture.

In the applications as a memory backup power supply for computers and as a power supply for portable equipment, the circuitry often causes the cells to be discharged beyond the rated capacity. That is, the cells are often operated in a over-discharge state for a prolonged period of time. Under the over-discharge conditions, lead acid batteries undergo irreversible reaction of electrode active materials, eventually resulting in a partial or sometimes complete loss of cell performance. In extreme cases, leakage of the electrolytic solution can occur, causing a failure of the circuitry itself. For nonaqueous electrolyte secondary cells using metal oxides such as manganese dioxide and vanadium pentoxide and chalcogenides such as molybdenum sulfide as the positive electrode, it is also known that the positive electrode active material is damaged by over-discharge to such an extent that normal charging/discharging operation is no longer possible. As to the nonaqueous electrolyte secondary cells using a conductive organic polymer, typically polyaniline as the positive electrode active material, there are available at present no cells which show satisfactory over-voltage recovery.

SUMMARY OF THE INVENTION

Therefore, an object of the present invention is to provide a nonaqueous electrolyte secondary cell which maintains stable performance over a long period of service without giving rise to an inconvenience like an increase of internal resistance. Another object of the present invention is to provide a nonaqueous electrolyte secondary cell which has an improved over-discharge recovery capacity so that it can resume satisfactory charging/discharging cycles even after it has been over-discharged.

The inventors have found that the deteriorated recovery of conventional polymer secondary batteries after over-discharge is not caused by the positive electrode active material (e.g., polyaniline) being damaged by over-discharge, but by the current collecting process. More particularly, the conventional nonaqueous electrolyte cells are generally designed such that a polyaniline or conductive organic polymer as the positive electrode active material is accommodated in a segmented outer casing such that the positive electrode mates with an outer casing positive segment. Several methods including the following three typical methods (1) to (3) have been proposed and practiced for collecting current at the positive electrode. Method (1) achieves direct contact by placing a positive electrode in direct contact with the inner surface of an outer casing positive segment under the force of a spring or biasing means. Method (2) utilizes a current collector by previously welding a metallic current collector to the inner surface of an outer casing positive segment and embedding a polyaniline or positive electrode active material in the positive current collector, thereby establishing electric contact between the active material and the outer casing positive segment. Method (3) is by previously embedding a metallic current collector in a positive electrode to form a composite positive electrode and welding the current collector to the inner surface of an outer casing positive segment. The cells based on these current collecting methods are well reliable and maintain stable performance for a long time when operated under normal conditions. However, when they are operated under severe conditions as inviting frequent over-discharge, they become difficult to appropriately charge again and their practical application is restricted.

The inventors made further research for an optimum current collecting method for a polymer cell. We have found that in a nonaqueous electrolyte secondary cell comprising a positive electrode having a polyaniline or electroconductive organic polymer as an active material, a negative electrode, a nonaqueous electrolyte, and an outer casing having these components received therein, the outer casing including positive and negative segments associated with the positive and negative electrodes, optimum current collection can be achieved on the positive electrode side by bonding the positive electrode to the inner surface of the outer casing positive segment through a conductive adhesive having carbon fine powder dispersed in a polymer, thereby establishing electric connection between the positive electrode and the outer casing positive segment through the conductive adhesive. The resulting polymer cell can maintain stable performance for a long time even when operated under severe conditions as often causing the cell to be over-discharged. The present invention is predicated on this finding.

Therefore, the present invention is directed to a nonaqueous electrolyte secondary cell comprising a positive electrode having an electroconductive organic polymer as an active material, a negative electrode electrically insulated from the positive electrode, a nonaqueous electrolyte, and an outer casing having these components received therein, the outer casing including segments associated with the positive and negative electrodes. According to the present invention, the positive electrode is affixed to the inner surface of the outer casing segment associated with the positive electrode through a polymer layer having carbon fine powder dispersed in a polymer.

BRIEF DESCRIPTION OF THE DRAWING

The above and other objects, features, and advantages of the invention will be better understood from the following description taken in conjunction with the accompanying drawing, in which:

the only FIGURE, FIG. 1 is a schematic cross section of a coin type secondary cell according to one embodiment of the invention.

DETAILED DESCRIPTION OF THE INVENTION

The non-aqueous electrolyte secondary cell of the present invention uses an electroconductive organic polymer as the positive electrode active material as described above. The conductive organic polymer used herein may be selected from the group consisting of polyaniline, polyacetylene, polypyrrole, and other conductive polymers. Among others, the polyaniline is preferred for high potential and excellent shelf storage. The polyaniline is not particularly limited, although electrochemical polyanilines prepared by electrolytic oxidative polymerization are preferred. Useful polyanilines are often prepared by electrolytic oxidative polymerization from an electrolytic solution containing 0.01 to 5 mol/kg, preferably 0.5 to 3 mol/kg of aniline and 0.02 to 10 mol/kg, preferably 1 to 6 mol/kg of acid. The acid used in the solution for electrolytic polymerization includes tetrafluoroboric acid $HBF_4$, hydrochloric acid HCl, sulfuric acid $H_2SO_4$, and perchloric acid $HClO_4$, and mixtures thereof. Preferred polymerizing conditions include a bath temperature of from $-5°$ C. to $25°$ C., especially from $0°$ to $15°$ C. Among others, the polyaniline which is prepared by electrolytic polymerization from an electrolytic solution containing tetrafluoroboric acid at $0°$ to $15°$ C. is most preferred because it is deposited on a polymerizing electrode as a smooth continuous film and easy to handle in subsequent steps.

According to the invention, when the above-mentioned positive electrode, the negative electrode, electrolyte and other components (these members will be described later) are accommodated in an outer casing, the positive electrode is bonded to the inner surface of an outer casing segment associated with the positive electrode through an adhesive layer having carbon fine powder dispersed in a polymer.

The polymer for the adhesive layer should provide a firm bond between the positive electrode of polyaniline or the like and the outer casing positive segment, be stable against the electrolytic solution in the cell, and be chemically stable. Illustrative examples of the polymer include polyacrylic acid, copolymers of acrylic acid and acrylates, carboxy-modified styrene-butadiene rubber, polychloroprene, carboxy-modified polychloroprene, polyisobutyrene, and epoxy resins.

The carbon fine powder which is blended and dispersed in the polymer should not give rise to undesirable reaction with the electrolytic solution in the cell over a service voltage range. Examples of the carbon include conductive carbon black, graphite powder and mixtures thereof, with the conductive carbon black being preferred. The carbon fine powder is blended with the polymer in any desired amounts, preferably so as to give a carbon/polymer weight ratio of from 1/5 to 5/1. Where the polymer used is polyacrylic acid, acrylic acid/acrylate copolymers, or carboxy-modified styrene-butadiene rubber, the carbon fine powder may be dispersed in an aqueous solution or emulsion of these polymers. In this case, however, it is critical to fully remove water after the positive electrode has been adhesively bonded. Water removal is preferably effected by vacuum drying.

The shape and material of the outer casing are not particularly limited. Preferably, the outer casing is well conductive, subject to sealing enclosure, chemically and electrochemically stable, inexpensive, and easy to handle. Stainless steel, especially ferrite stainless steel is a useful casing material. The casing may take any desired shapes including coin, button and cylinder shapes consisting of positive and negative casing segments and a box shape consisting of a main casing and a lid.

The negative electrode uses an active material often in the form of a metal capable of forming a cation or an alloy allowing a cation to be efficiently dissolved and precipitated. Examples of the negative electrode active material include lithium, sodium, magnesium and alloys containing at least one of them. Lithium and lithium-aluminum alloys are preferred.

The electrolyte which is used in the cell of the invention is a compound of an anion and a cation. Some illustrative, non-limiting examples of the electrolyte are $LiBF_4$, $LiPF_6$, $LiSbF_6$, $LiAsF_6$, $LiClO_4$, LiI, LiBr, LiCl, $NaPF_6$, $NaSbF_6$, $NaAsF_6$, $NaClO_4$, NaI, $KPF_6$, $KSbF_6$, $KAsF_6$, $KClO_4$, $LiAlCl_4$, $LiHF_2$, LiSCN, and mixtures thereof. Preferred among them are $LiPF_6$, $LiBF_4$, and a mixture of $LiPF_6$ and $LiBF_4$. The electrolyte is preferably present in a concentration of 1 to 6 mol/liter of solvent.

These electrolytes are generally used in solution form by dissolving in nonaqueous solvents. The preferred non-aqueous solvents used herein are relatively highly polar solvents. Examples include propylene carbonate, ethylene carbonate, diethyl carbonate, benzonitrile, acetonitrile, tetrahydrofuran, 2-methyltetrahydrofuran, $\gamma$-butyrolactone, triethyl phosphate, triethyl phosphite, dimethyl sulfate, dimethylformamide, dimethylacetamide, dimethyl sulfoxide, dioxane, dimethoxyethane, diethoxyethane, polyethylene glycol, sulfolane, dichloroethane, chlorobenzene, nitrobenzene, and mixtures of thereof.

The electrolyte used in the cell of the invention further includes organic solid electrolytes which are obtained by impregnating such polymers as polyethylene oxide, polypropylene oxide, isocyanate-crosslinked polyethylene oxide, and a phosphazene polymer having an ethylene oxide oligomer side chain with the above-mentioned electrolyte compounds; and inorganic solid electrolytes, for example, inorganic ion conductors such as $Li_3N$ and $LiBCl_4$ and lithium glass species such as $Li_4SiO_4$ and $Li_3BO_3$.

The secondary cell of the invention is generally constructed by interposing the electrolyte solution between the positive and negative electrodes. If desired, a separator may be interposed between the positive and negative electrodes in order to prevent the electrodes from contacting each other to cause current shortcircuit. The separator is preferably a porous material which can be impregnated with and allow passage of the electrolyte, for example, woven and non-woven fabrics, nets and porous members of synthetic resins such as polyethylene and polypropylene and natural fibers.

FIG. 1 shows one typical coin type secondary cell to which the present invention is applicable. The cell includes a positive electrode 1, a separator 7, and a negative electrode 4 in a sandwich structure. A positive casing segment 3 and a negative casing segment 5 are mated together to define a cell space. The sandwich of positive electrode 1, separator 7, and negative electrode 4 are disposed in the space between the positive and negative casing segments 3 and 5. An annular gasket 6 is interposed between the casing segments 3 and 5 to form a seal therebetween. A conductive adhesive layer or polymer layer 2 is disposed between the positive electrode 1 and the inner surface of the positive casing segment 3 to adhesively bond them together.

EXAMPLE

An example of the present invention is given below by way of illustration and not by way of limitation. In the example, C is Coulomb, mA is milliampere, V is volt, and H is hour.

EXAMPLE

A polyaniline was polymerized and deposited on a mesh stainless steel SUS 316 from an aqueous solution containing 1 mol/kg of aniline and 2 mol/kg of $HBF_4$ at 4°-6° C. by electrolytic oxidative polymerization at a quantity of electricity of 50 $C/cm^2$. The polyaniline/stainless steel mesh structure was washed with deionized water, thoroughly dried at room temperature for 48 hours, and then punched to form a positive electrode disk having a diameter of 15 mm.

A coin type secondary cell having the structure shown in FIG. 1 was fabricated. A conductive adhesive was prepared by dispersing conductive carbon black (#3250 manufactured by Mitsubishi Chemicals Ltd.) in an aqueous solution of polyacrylic acid. The adhesive consisted of about 15% by weight of carbon black, about 20% by weight of polyacrylic acid, and the balance of deionized water. The positive electrode disk was bonded to the inner surface of a casing positive segment of SUS 444 with the adhesive. The assembly (adhesive layer) was vacuum dried at 80° C. for 8 hours.

The negative electrode used was an Li-Al alloy. The electrolyte solution used was a non-aqueous electrolyte solution containing $LiBF_4$ in a solvent mixture of propylene carbonate and dimethoxyethane.

The cell was charged with a constant current of 0.5 mA to a voltage of 3.0 V and further charged at a constant voltage of 3.0 V for a total 15 hours, and then discharged with a constant current of 0.3 mA to a voltage of 2.0 V. This charging/discharging cycle was repeated three times. With a fixed resistor of 3 k$\Omega$ connected across the cell, the cell was allowed to discharge for 30 days. This cell was again charged and discharged by the same procedure as above for the purpose of examining the recovery of its discharge capacity. The discharge capacity before the over-discharge test was 3.6 mAH and the discharge capacity upon discharging after charging at the end of the test was 3.2 mAH. The percent recovery of discharge capacity was 89%.

COMPARATIVE EXAMPLE

A polyaniline/stainless steel mesh disk having a diameter of 15 mm was prepared by the same procedure as in Example. Part of the polyaniline film was scraped off to partially expose the SUS 316 stainless steel mesh. The disk on the exposed steel mesh side was spot welded to a casing positive segment of SUS 444. A coin type cell was fabricated by thereafter following the same steps as in Example.

The cell was subjected to the same over-discharge test as in Example. The discharge capacity before the over-discharge test was 3.1 mAH, but the discharge capacity after the test was as low as 0.2 mAH. The percent recovery of discharge capacity was 6%.

There has been described a nonaqueous electrolyte secondary cell in which the positive electrode is affixed to the inner surface of an outer casing positive segment through a conductive adhesive having carbon fine powder dispersed in a polymer. The cell maintains stable performance over a long period of service without giving rise to an inconvenience like an increase of internal resistance. The cell has an improved ability to recover from over-discharge in that it can resume satisfactory charging/discharging cycles even after it has been over-discharged. The cell will find commercial uses in the application where the cell can be over-discharged, for example, as a memory backup power supply for computers and as a power supply for portable equipment.

Although some preferred embodiments have been described, many modifications and variations may be made thereto in the light of the above teachings. It is therefore to be understood that within the scope of the appended claims, the invention may be practiced otherwise than as specifically described.

We claim:

1. In a nonaqueous electrolyte secondary cell comprising a positive electrode having a polyaniline as an active material, a negative electrode electrically insulated from the positive electrode, a nonaqueous electrolyte, and an outer casing having these compounds received therein, the outer casing including mutually insulated segments associated with the positive and negative electrodes, the improvement wherein said positive electrode is affixed to the inner surface of the outer casing segment associated with said positive electrode through a polymer layer formed by applying a polymer aqueous solution comprised of a polyacrylic acid or copolymer of acrylic acid and an acrylate dissolved in water and containing carbon fine powder to said positive electrode or outer casing segment and then drying.

2. The cell of claim 1 wherein the carbon powder is selected from the group consisting of conductive carbon black, graphite powder and mixtures thereof.

3. The cell of claim 1 wherein the carbon fine powder is blended with the polymer so as to give a carbon/polymer weight ratio of from 1/5 to 5/1.

4. A nonaqueous electrolyte secondary cell comprising a positive electrode having a polyaniline as an active material, a negative electrode electrically insulated from the positive electrode, a nonaqueous electrolyte, and an outer casing having these components received therein, the outer casing including mutually insulated segments associated with the positive and negative electrodes, said positive electrode being affixed to the inner surface of the outer casing segment associated with said positive electrode through a polymer layer formed by applying a polymer aqueous solution composed of a polyacrylic acid or copolymer of acrylic acid and an acrylate dissolved in water containing carbon fine powder to said positive electrode or outer casing segment and then drying the applied polymer solution.

5. The cell of claim 4, wherein the carbon powder is selected from the group consisting of conductive carbon black, graphite powder and mixtures thereof.

6. The cell of claim 4, wherein the carbon fine powder is blended with the polymer so as to give a carbon/polymer weight ratio of from 1/5 to 5/1.

* * * * *